(12) United States Patent
Ohsawa et al.

(10) Patent No.: US 12,222,035 B2
(45) Date of Patent: Feb. 11, 2025

(54) CHAIN TENSIONER

(71) Applicant: TSUBAKIMOTO CHAIN CO., Osaka (JP)

(72) Inventors: Seigo Ohsawa, Osaka (JP); Taiki Sekiguchi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/232,400

(22) Filed: Aug. 10, 2023

(65) Prior Publication Data
US 2024/0068547 A1 Feb. 29, 2024

(30) Foreign Application Priority Data
Aug. 29, 2022 (JP) ................................. 2022-136286

(51) Int. Cl.
*F16H 7/08* (2006.01)

(52) U.S. Cl.
CPC ... *F16H 7/0829* (2013.01); *F16H 2007/0806* (2013.01)

(58) Field of Classification Search
CPC ........... F16H 2007/0855; F16H 7/0829; F16H 2007/0806; F16H 2007/0812;
(Continued)

(56) References Cited

U.S. PATENT DOCUMENTS

| 5,704,860 A * | 1/1998 | Stief | F16H 7/0848 |
| | | | 474/138 |
| 6,244,982 B1 * | 6/2001 | Merelli | F16H 7/08 |
| | | | 474/138 |

(Continued)

FOREIGN PATENT DOCUMENTS

| DE | 102017127802 A1 * | 5/2019 | ............... F16H 7/08 |
| DE | 102019129901 A1 * | 5/2021 | |

(Continued)

OTHER PUBLICATIONS

Harasaki, "Harasaki JP_2004084801_A1", 2024, Clarivate Analytics. (Year: 2024).*

(Continued)

*Primary Examiner* — Michael R Mansen
*Assistant Examiner* — Katelynne R Burrell
(74) *Attorney, Agent, or Firm* — WHDA, LLP

(57) ABSTRACT

To provide a simple-structured chain tensioner that reduces the burden of work required for assembling and maintenance, sufficiently damps the motion of the plunger, and helps reduce machining costs and size increases of the plunger and tensioner body. The chain tensioner includes a tensioner body with a plunger bore, a plunger, and a biasing member that biases the plunger. The plunger has raised portions with which a locking member engages. The plunger bore is provided with a locking member holding part on one side that is open. The locking member holding part is provided with an inclined surface at one end in the plunger entry direction, the inclined surface becoming progressively shallower in the plunger entry direction. The locking member can deform elastically in a cross section when engaging with the raised portion of the plunger.

3 Claims, 4 Drawing Sheets

(58) Field of Classification Search
CPC ..... F16H 2007/0853; F16H 2007/0859; F16H 2007/0819; F16H 2007/0846; F16H 2007/0874; F16H 2007/0876; F16H 2007/0891; F16H 7/0848; F16H 7/08; F16H 7/0838; F16J 9/22; F16J 10/02
USPC .......................................................... 474/110
See application file for complete search history.

(56) References Cited

U.S. PATENT DOCUMENTS

| | | | | |
|---|---|---|---|---|
| 6,849,012 B2* | 2/2005 | Poiret | ................... | F16H 7/0848 |
| | | | | 474/110 |
| 7,223,190 B2* | 5/2007 | Yoshida | ................ | F16H 7/0831 |
| | | | | 474/110 |
| 7,427,250 B2* | 9/2008 | Yoshida | ................ | F16H 7/0836 |
| | | | | 474/110 |
| 8,282,520 B2* | 10/2012 | Kurematsu | ........... | F16H 7/0836 |
| | | | | 474/111 |
| 8,419,575 B2* | 4/2013 | Yoshida | ................ | F16H 7/0848 |
| | | | | 474/110 |
| 8,568,258 B2* | 10/2013 | Hayami | ................ | F16H 7/0848 |
| | | | | 474/111 |
| 8,740,736 B2* | 6/2014 | Kurematsu | ........... | F16H 7/0848 |
| | | | | 474/110 |
| 9,115,788 B2* | 8/2015 | Kurematsu | ................ | F16H 7/08 |
| 10,871,208 B2* | 12/2020 | Yoshida | ................ | F16H 7/0848 |
| 11,125,304 B2* | 9/2021 | Watanabe | ................ | F16H 7/08 |
| 11,231,091 B2* | 1/2022 | Onimaru | ................... | F16H 7/08 |
| 11,339,855 B2* | 5/2022 | Okada | ........................ | F16H 7/08 |
| 2007/0054767 A1* | 3/2007 | Yamada | ................ | F16H 7/0848 |
| | | | | 474/110 |
| 2008/0280711 A1* | 11/2008 | Sato | ....................... | F16H 7/0836 |
| | | | | 474/110 |
| 2010/0062886 A1* | 3/2010 | Yamamoto | ........... | F16H 7/0836 |
| | | | | 474/110 |
| 2011/0269584 A1* | 11/2011 | Yoshida | ................ | F16H 7/0848 |
| | | | | 474/101 |
| 2019/0353228 A1* | 11/2019 | Sun | ....................... | F16H 7/0834 |
| 2021/0131532 A1* | 5/2021 | Onimaru | ................... | F16H 7/08 |
| 2024/0068547 A1* | 2/2024 | Ohsawa | ................ | F16H 7/0848 |

FOREIGN PATENT DOCUMENTS

| | | | |
|---|---|---|---|
| JP | 2002-5249 A | 1/2002 | |
| JP | 2004084801 A * | 3/2004 | .......... F16H 7/0836 |

OTHER PUBLICATIONS

Farkas, "Farkas English Translation DE_102019129901A1", 2024, Clarivate Analytics. (Year: 2024).*

* cited by examiner

ENLARGED VIEW OF PART A

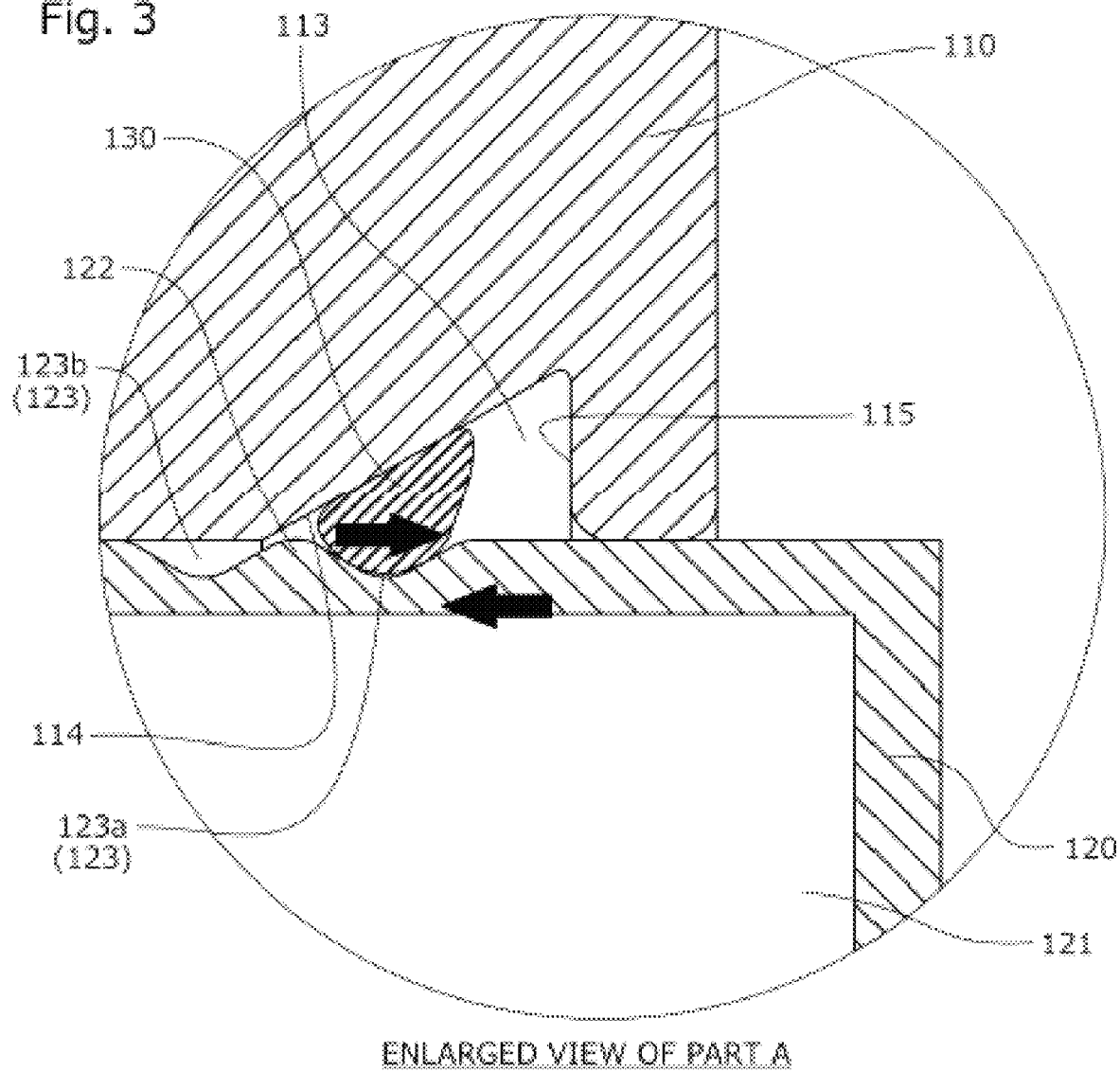

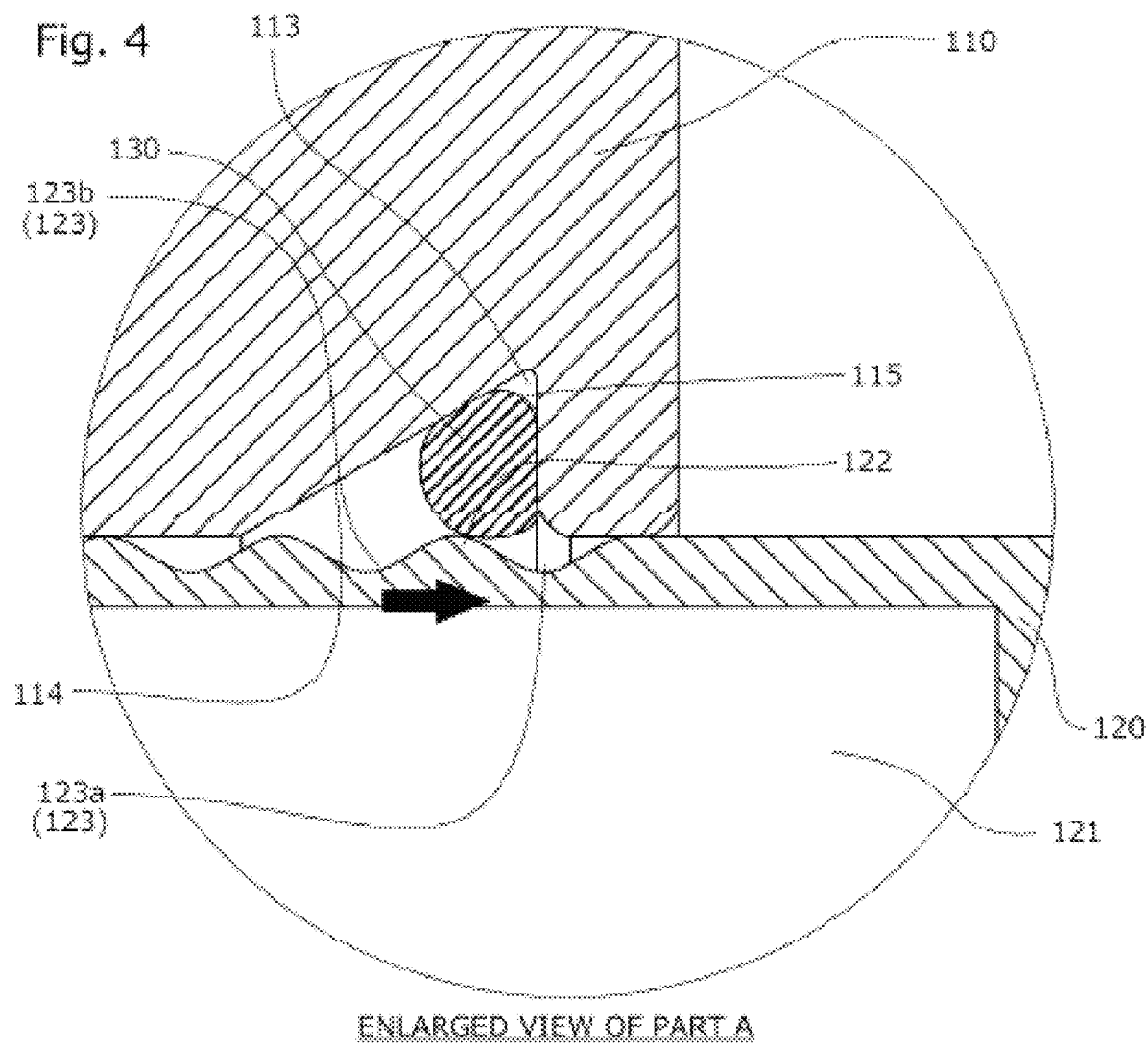

CHAIN TENSIONER

BACKGROUND OF THE INVENTION

1. Field of the Invention

The present invention relates to a chain tensioner, which includes a tensioner body with a plunger bore that is open on one side, a cylindrical plunger slidably inserted in the plunger bore, and a biasing member that biases the plunger in the extension direction, and which is used to keep correct tension in a chain.

2. Description of the Related Art

Chain tensioners are commonly used to maintain the correct tension of a chain. For example, a chain guide mechanism for a drive chain, such as an endless roller chain passing over respective sprockets of a crankshaft and a cam shaft inside an engine room, uses a chain tensioner to bias a pivoting chain guide that slidably guides the chain with a guide shoe to keep the correct tension, as described in Japanese Patent Application Publication No. 2002-005249.

The chain tensioner described in Japanese Patent Application Publication No. 2002-005249 includes a tensioner body (housing 1) with a plunger bore (cylinder part 11) that is open on one side, a cylindrical plunger 3 slidably inserted in the plunger bore (cylinder part 11), and a biasing member (return spring 5) that biases the plunger 3 in the extension direction.

The plunger 3 includes on the outer circumferential surface thereof a plurality of annular raised portions (wall surfaces 331 and 332). A locking member (register ring 7) is attached around the plunger 3 so as to be able to engage with the raised portions of the plunger (wall surfaces 331 and 332).

The interior of the plunger bore (cylinder part 11) and the plunger 3 is filled with oil. The oil pressure elicits the effect of damping the movement of the plunger 3 when it moves back and forth inside the plunger bore (cylinder part 11) due to the plunger 3 receiving vibration of the chain during the operation of the engine.

The locking member (register ring 7) is movable within a locking member holding part (guide groove 18) located on the open side of the plunger bore (cylinder part 11). The locking member can move back and forth a predetermined distance along with the back and forth movement of the plunger. When the plunger 3 moves beyond the range of the locking member holding part (guide groove 18) toward the open side of the plunger bore (cylinder part 11), the locking member (register ring 7) radially expands to ride over the slope (taper surface) of the raised portions of the plunger (wall surfaces 331 and 332), and engages with the locking wall 331 of one of the raised portions of the plunger (wall surfaces 331 and 332).

When the plunger 3 starts to move in an entry direction thereof into the plunger bore (cylinder part 11), the locking member (register ring 7) also moves with the plunger 3 within the locking member holding part (guide groove 18). When the locking member (register ring 7) contacts an inclined surface (first stopper 21) of the locking member holding part (guide groove 18), the locking member (register ring 7), now being held between the inclined surface (first stopper 21) and the locking wall 331, stops the movement of the plunger 3 in the entry direction into the plunger bore (cylinder part 11).

In this way, the vibration amplitude of the plunger 3 is kept within the range where the plunger can sufficiently press the chain, and therefore the plunger can keep the correct chain tension even when the chain has stretched due to wear.

The assembly of this tensioner involves a process of inserting the plunger 3 into the plunger bore (cylinder part 11) while radially expanding the locking member (register ring 7) within the locking member holding part (guide groove 18) with the use of a tool or dedicated equipment.

SUMMARY OF THE INVENTION

The chain tensioner known from Japanese Patent Application Publication No. 2002-005249 still has some scope of improvement.

Namely, one drawback of the chain tensioner according to Japanese Patent Application Publication No. 2002-005249 is that it is necessary to keep the locking member radially expanded continuously with the use of a tool or dedicated equipment when mounting the plunger in the plunger bore. This process is often carried out in a condition that makes the work difficult, e.g., implementing the work for the chain tensioner that is already mounted in the engine or the like, because of which the assembling and maintenance work are cumbersome.

The locking member, or register ring, which is a ring-like metal spring, can stop the movement of the plunger entering into the plunger bore at the position between the inclined surface and the locking wall. However, since it is made of metal and has poor cushioning properties, the locking member directly receives the kinetic energy of the in-coming plunger.

There may be situations where the tensioner is not fully filled with oil, depending on the operating conditions such as at the start of the engine or during high-speed operation, or in the case of poor oil pump performance. In such cases, while the stroke of the plunger may be controlled, the kinetic energy of the plunger may not be damped, which may result in unstable operation of the tensioner. In some cases, the unstable movement of the plunger may result in rattling of the chain, which causes a large noise.

The locking member, or register ring, which is a ring-like metal spring radially extendible and contractible, is disposed so as to surround the outer circumferential surface of the plunger. The plunger therefore requires raised portions that extend all around the outer circumference of the plunger to engage with the locking member. This leads to an increase in the machining cost of the plunger.

The locking member in the form of such a register ring requires a device such as a tool or dedicated equipment for enlarging the diameter. This leads to an increase in size of the tensioner body due to the necessity to provide space for allowing entry of the equipment around the plunger bore, as well as leads to an increase in the machining cost of the tensioner body.

The present invention solves these problems, and it is an object of the invention to provide a simple-structured chain tensioner that reduces the burden of work required for assembling and maintenance, sufficiently damps the motion of the plunger even when the tensioner is not filled with oil, and helps reduce machining costs and size increases of the plunger and tensioner body.

The present invention achieves the above object by providing a chain tensioner that includes a tensioner body with a plunger bore that is open on one side, a cylindrical plunger slidably inserted in the plunger bore, and a biasing member that biases the plunger in an extension direction. The plunger includes on an outer circumferential surface thereof a plurality of raised portions with which a locking member engages. The plunger bore is provided with a locking member holding part on one side that is open, the locking member holding part being open toward a center axis of the plunger and holding the locking member. The locking member holding part is provided with an inclined surface at least at one end in a plunger entry direction in which the plunger enters into the plunger bore, the inclined surface becoming progressively shallower in the plunger entry direction. The locking member is allowed to deform elastically in a cross section inside the locking member holding part when engaging with the raised portion of the plunger.

In the chain tensioner according to one aspect of the present application, the plunger includes on an outer circumferential surface thereof a plurality of raised portions with which a locking member engages. The plunger bore is provided with a locking member holding part on one side that is open. The locking member holding part is provided with an inclined surface at one end in the plunger entry direction, the inclined surface becoming progressively shallower in the plunger entry direction. The locking member is allowed to deform elastically in a cross section inside the locking member holding part when engaging with the raised portion of the plunger. When the plunger moves inside the plunger bore, the locking member compressed between the raised portion of the plunger and the inclined surface of the plunger bore can damp the motion of the plunger in the plunger entry direction.

Since the locking member can sufficiently damp the kinetic energy of the plunger moving into the plunger bore even in a situation where the plunger bore and plunger are not filled with oil, chain rattling and noise generation can be minimized.

When the chain has stretched due to wear, the plunger extends toward the open side of the plunger bore. In this case, the locking member expands in diameter and rides over the raised portion of the plunger inside the locking member holding part, allowing the movement of the plunger toward the open side of the plunger bore. When the plunger tries to move in the plunger entry direction again, the locking member engages with the raised portion of the plunger it rode over, becomes compressed between the raised portion of the plunger and the inclined surface of the plunger bore, and can restrict the entering movement of the plunger into the plunger bore.

The locking member may be made of an elastic material such as rubber, for example. The locking member can then be readily expanded or contracted without a tool or equipment and can be readily fitted around the plunger.

There is no need to provide space for allowing work to be performed with a tool or equipment in the tensioner body, which helps avoid increases in machining cost and size of the chain tensioner.

According to the configuration of another aspect of the present application, the raised portions of the plunger are formed on an outer circumferential surface of the plunger in an annular form. This ensures that the locking member inside the locking member holding part engages with the plunger's raised portion regardless of the orientation of the outer circumferential surface of the plunger, so that there is no need to provide a configuration for restricting the orientation of the plunger, which helps reduce the production cost.

According to the configuration of another aspect of the present application, the locking member holding part has a volume that is equal to or larger than that of the locking member. The locking member can thus be entirely accommodated inside the locking member holding part by radially expanding or elastically deforming in cross section, when the plunger moves toward the open side of the plunger bore.

Therefore, the locking member can allow the plunger to move toward the open side of the plunger bore without applying a large resisting force to the plunger.

According to the configuration of another aspect of the present application, the locking member holding part is formed in an annular form, and the locking member has a ring-like shape. Therefore, the locking member can engage with the raised portion of the plunger over the entire circumference of the plunger, and can uniformly damp the movement of the plunger in the plunger entry direction with a force over the entire circumference.

Furthermore, it is also possible to reuse the tensioner body with a locking member holding part for conventional metal rings such as register rings, which can help reduce production costs.

According to the configuration of another aspect of the present application, the locking member holding part is formed as a plurality of holes open toward the center axis of the plunger bore, and the locking member has a spherical shape. The resisting force applied by the locking member to the plunger can be readily tailored by adjusting the number of the locking member holding parts and locking members.

According to the configuration of another aspect of the present application, the locking member holding part is formed as a groove open toward the center axis of the plunger bore, and the locking member has a bar-like shape with ends. The resisting force applied by the locking member to the plunger can be readily tailored by adjusting the number of the locking member holding parts and locking members. Moreover, the amount of oil flow between the outer circumferential surface of the plunger and the plunger bore can be tailored by adjusting the orientation or position of the locking member holding parts in the form of grooves.

According to the configuration of another aspect of the present application, the locking member is at least partly secured to the locking member holding part. This ensures that at least a part of the locking member will remain inside the locking member holding part when the locking member is compressed between the raised portion of the plunger and the inclined surface and undergoes a large elastic deformation in cross section. The locking member, when released from the compression, can then restore its shape reliably, as it is located inside the locking member holding part.

Moreover, fixing the locking member will prevent it from misalignment, detachment, or entanglement between the plunger and the plunger bore, during the assembly of the chain tensioner.

BRIEF DESCRIPTION OF THE DRAWINGS

FIG. 3 is a schematic enlarged view of part A of the chain tensioner 100 according to one embodiment of the present invention, illustrating a state when the plunger 120 has moved in the plunger entry direction; and FIG. 4 is a schematic enlarged view of part A of the chain tensioner 100 according to one embodiment of the present invention, illustrating a state when the plunger 120 has moved to the open side of the plunger bore 111.

DESCRIPTION OF THE PREFERRED EMBODIMENTS

Hereinafter, a chain tensioner 100 according to one embodiment of the present invention will be described with reference to the drawings.

Figure 2:
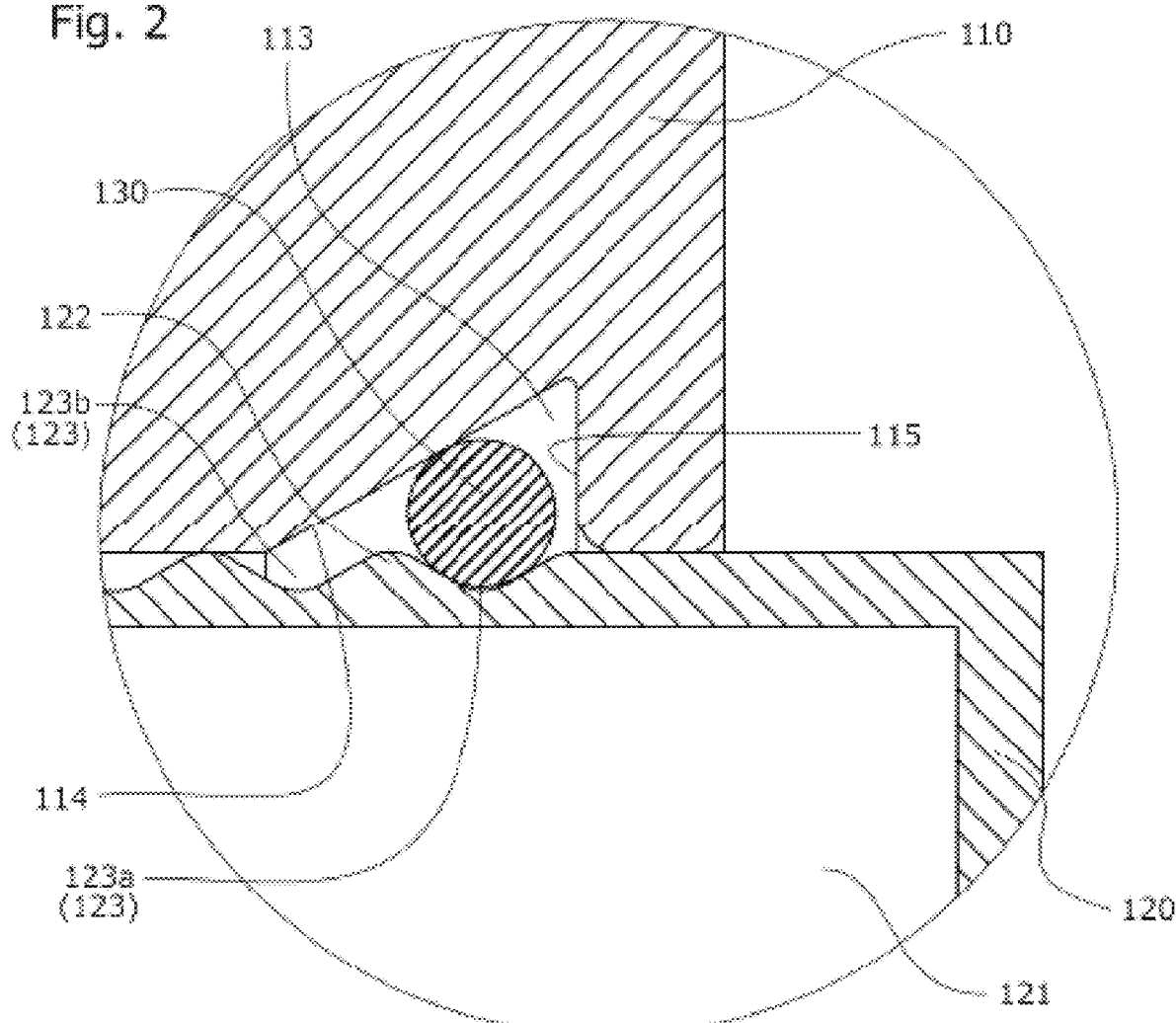
FIG. 2 is a schematic enlarged view of part A of the chain tensioner 100 according to one embodiment of the present invention.

For ease of explanation, illustration of components other than the tensioner body 110, plunger 120, and locking member 130 is omitted in FIG. 2 to FIG. 4.

Figure 1:
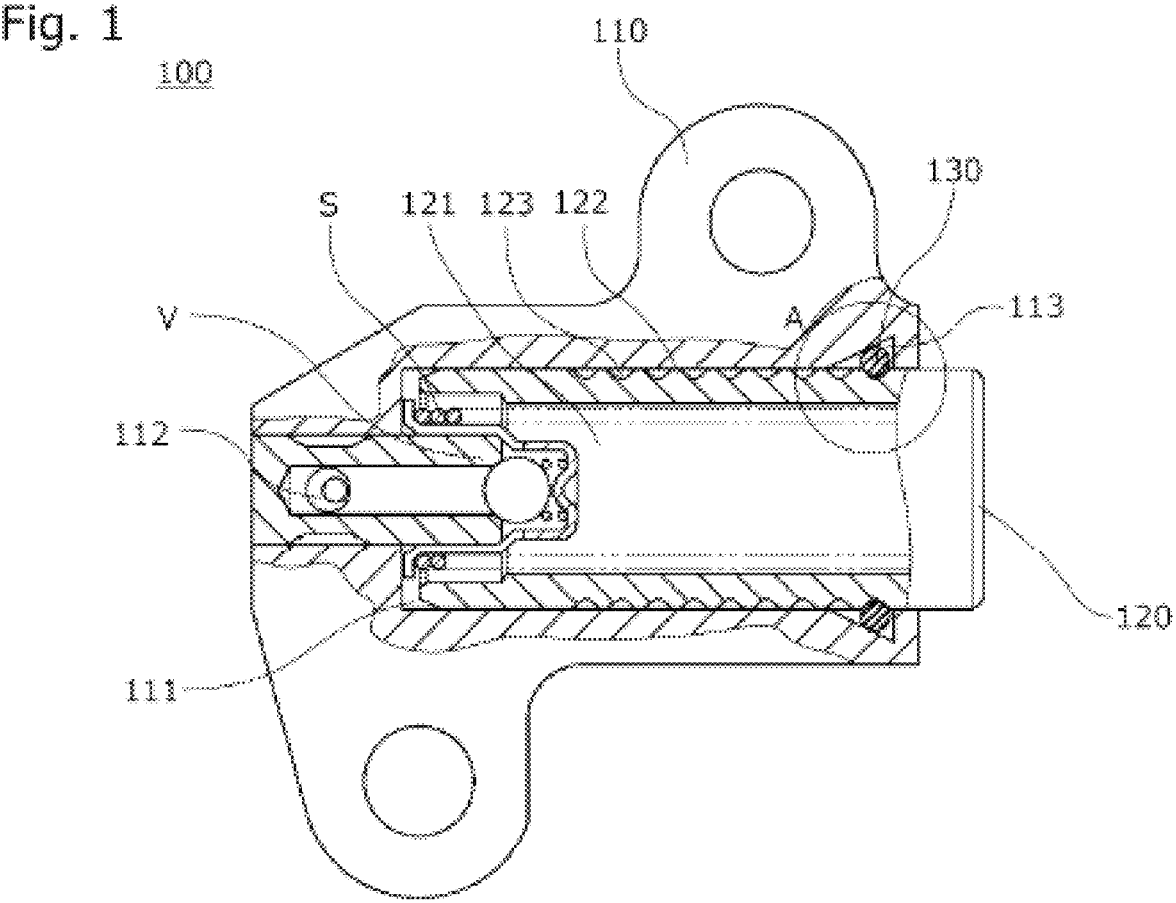
FIG. 1 is a partial cross-sectional view of a chain tensioner 100 according to one embodiment of the present invention.

The chain tensioner 100 includes a tensioner body 110 with a plunger bore 111 that is open on one side, a cylindrical plunger 120 slidably inserted in the plunger bore 111, and a biasing member S that biases the plunger 120 in the extension direction, as shown in FIG. 1 and FIG. 2.

The tensioner body 110 has an oil supply path 112 in the back of the plunger bore 111. A check valve V shuts off flow between the oil supply path 112 and the plunger bore 111. Pressure from the oil supply path 112 side opens the check valve V to allow the oil to be supplied.

A locking member holding part 113 in the form of an annular groove is provided on the inner circumferential surface on the open side of the plunger bore 111. The groove opens toward the center axis of the plunger bore 111.

The locking member holding part 113 is composed of a locking wall 115 on the open side of the plunger bore 111 and an inclined surface 114. The inclined surface 114 is formed such that the locking member holding part becomes progressively shallow inwards of the plunger bore 111.

The locking member holding part 113 has a volume that is at least larger than that of the locking member 130 to be described later.

The plunger 120 includes a plunger hole 121, and a plurality of raised portions 122 and depressed portions 123 on its outer circumferential surface.

The plunger hole 121 is configured to allow the biasing member S to fit in, which constantly biases the plunger 120 towards the open side of the plunger bore 111.

The locking member 130 is an annular elastic member made of rubber for example and able to elastically change its cross-sectional shape upon application of an external force. The locking member 130 has an inside diameter that is at least smaller than the outside diameter of the raised portions 122 of the plunger.

Next, the process of mounting the plunger 120 and locking member 130 of the chain tensioner 100 according to one embodiment of the present invention is described with reference to FIG. 1 and FIG. 2.

First, the check valve V is attached to shut off flow between the plunger bore 111 and the oil supply path 112 of the tensioner body 110.

Next, the biasing member S, plunger 120, and locking member 130 are assembled into the plunger bore 111.

The locking member 130 is positioned between the plunger's depressed portion 123 that is located nearest the open end of the plunger bore 111 and the locking member holding part 113.

Next, how the plunger 120 of the chain tensioner 100 according to one embodiment of the present invention provides the vibration damping effect is explained with reference to FIG. 1 to FIG. 4.

The plunger 120 is constantly biased in the extension direction by the biasing member S, i.e., towards the open side of the plunger bore 111 to apply tension via a guide shoe (not shown) to the chain (not shown) passed around in the engine (not shown).

The space between the plunger bore 111 and the plunger hole 121, which is filled with oil supplied from the oil supply path 112 via the check valve V when the engine (not shown) is running, functions as an oil pressure chamber or hydraulic damper, and damps the vibration applied from the guide shoe (not shown) to the plunger 120. The vibration energy of the plunger 120 is thus reduced, which effectively prevents the chain from rattling or minimizes noise generation.

The oil inside the oil pressure chamber is allowed to flow out slightly through an oil flow passage (not shown) provided in the plunger bore 111 or the plunger 120.

When the engine is started for the first time, or immediately after the engine that has not been operated for a while is started, the oil pressure chamber may not be fully filled with oil. When this is the case, the oil pressure chamber cannot serve the function of a hydraulic damper and may fail to damp the vibration energy of the plunger 120, so that unstable movement of the plunger 120 may result in chain rattling or noise generation.

Now, how the locking member 130 behaves in response to the vibration of the plunger 120 at the start of the engine will be described.

When the plunger 120 moves into the plunger bore 111 (hereinafter "plunger entry direction"), the locking member 130 moves in the plunger entry direction along with a raised portion 122 of the plunger as shown in FIG. 3.

The locking member 130 between the inclined surface 114 and the depressed portion 123a elastically deforms and changes its cross section to some extent. However, since the inclined surface 114 of the locking member holding part 113 is formed such that the holding part becomes progressively shallow inwards of the plunger bore 111, the locking member 130 soon applies a reaction force to the plunger 120 via the depressed portion 123a of the plunger, gradually slowing down, and eventually stopping, the movement of the plunger 120 in the plunger entry direction.

Therefore, even in a situation where the oil pressure chamber is not fully filled with oil such as when the engine is started, the movement of the plunger 120 in the plunger entry direction can be sufficiently damped by the reaction force generated by the cross-sectional elastic deformation of the locking member 130 so that chain rattling and noise generation can be minimized.

When the plunger 120 moves out from the plunger bore 111 (hereinafter "plunger extension direction"), the locking member 130 moves in the plunger extension direction along with the plunger 120 until the locking member contacts the locking wall 115, as shown in FIG. 4.

The locking member 130 is stopped when it comes into contact with the locking wall 115. However, as the plunger 120 keeps moving in the plunger extension direction, the locking member 130 gradually increases in diameter along the contour between the depressed portion 123a and the raised portion 122 of the plunger, and elastically changes the cross-sectional shape in conformity to the locking member holding part 113.

The locking member 130 thus disengages from the depressed portion 123a and raised portion 122 of the plunger, allowing the plunger 120 to keep moving in the plunger extension direction and press the chain via the guide shoe without resistance from the locking member 130.

If the chain has worn due to wear by then, the plunger 120 moves out further so that the locking member 130 rides over the plunger's raised portion 122 and fits into the depressed portion 123b.

The locking member holding part 113 has a larger volume than that of the locking member 130. Therefore, the locking member 130, when riding over the plunger's raised portion 122, can shift into the locking member holding part 113 almost entirely so that the locking member 130 hardly applies a resisting force to the plunger 120 moving in the plunger extension direction.

When the plunger 120 moves in the plunger entry direction again, the locking member 130 held between the plunger's depressed portion 123b and the inclined surface 114 restricts the amount of movement of the plunger 120 while also damping the kinetic energy of the plunger.

This way, the vibration amplitude of the plunger 120 is kept within the range where the plunger can sufficiently press the chain, and therefore the plunger can keep the correct chain tension even when the chain has stretched due to wear.

The locking member 130 does not have to be in an annular form. For example, the locking member may have a bar-like shape with ends, or a spherical shape, and a plurality of locking member holding parts in the form of recessed grooves or holes may be formed in the inner circumferential surface of the plunger bore 111 in conformity to the shape of the locking member. Raised portions and depressed portions in the form of protrusions and grooves may be formed on the outer circumferential surface of the plunger in conformity to the number and shape of the locking member.

In the case with a spherical locking member 130, for example, the resisting force applied by the locking member to the plunger can be readily tailored by adjusting the number or arrangement of the locking member holding parts and locking members. In the case with a segmented bar-like locking member 130, the resisting force applied by the locking member to the plunger can be readily tailored by adjusting the number or arrangement of the locking member holding parts and locking members, as well as the amount of oil flow between the outer circumferential surface of the plunger and the plunger bore can be tailored by adjusting the orientation or position of the locking member holding parts in the form of grooves.

Optionally, the locking member 130 may be partly fixed to the locking member holding part 113 by bonding or welding. This ensures that at least a part of the locking member 130 will remain inside the locking member holding part 113 when the locking member 130 is compressed between the raised portion 122 of the plunger and the inclined surface 114 and undergoes a large elastic deformation in cross section. The locking member 130, when released from the compression, can then restore its shape reliably, as it is located inside the locking member holding part 113.

Moreover, fixing the locking member 130 will prevent it from misalignment, detachment, or entanglement between the plunger 120 and the plunger bore 111, during the assembly of the chain tensioner 100.

While one embodiment of the present invention has been described in detail, the present invention is not limited to the embodiment described above and may be carried out with various design changes without departing from the scope of the present invention set forth in the claims.

The configuration of the locking member holding part is not limited to the one with an inclined surface and a locking wall described in the embodiment above. For example, there may be a connecting wall that connects the inclined surface and the locking wall. Optionally, the inclined surface may include some parts with inclination angles varied stepwise.

The locking member is not limited to the annular, or segmented bar-like or spherical shape mentioned in the embodiment above. For example, the locking member may be formed in a tubular, prismatic, or pyramid shape.

In the embodiment described above, an oil flow passage is provided in the plunger bore and the plunger. The configuration of the oil flow passage is not limited to this example. For example, a slight gap between the plunger bore and the plunger may serve as an oil flow passage, or a groove may be provided on the surface of the locking member to serve as an oil flow passage.

What is claimed is:

1. A chain tensioner comprising:
    a tensioner body with a plunger bore that is open on one side;
    a cylindrical plunger slidably inserted in the plunger bore; and
    a biasing member that biases the plunger in an extension direction,
    the plunger including on an outer circumferential surface thereof a plurality of raised portions of the plunger with which a locking member engages,
    the plunger bore being provided with a locking member holding part on one side that is open, the locking member holding part being open toward a center axis of the plunger and holding the locking member,
    the locking member holding part being provided with an inclined surface at least at one end in a plunger entry direction in which the plunger enters into the plunger bore, the inclined surface becoming progressively shallower in the plunger entry direction,
    the locking member holding part is formed in a ring,
    the locking member is formed into an endless ring shape,
    the locking member forces the plunger in a direction that causes the diameter of the locking member to contract,
    the locking member being an elastic member to deform elastically in a cross section inside the locking member holding part to have a cross sectional shape conforming to the inclined surface of the locking member holding part when engaging with the raised portions of the plunger.

2. The chain tensioner according to claim 1, wherein the raised portions of the plunger are formed on an outer circumferential surface of the plunger in an annular form.

3. The chain tensioner according to claim 1, wherein the locking member holding part has a volume that is equal to or larger than that of the locking member.

* * * * *